(12) United States Patent
Whitmore (10) Patent No.: US 8,150,717 B2
(45) Date of Patent: Apr. 3, 2012

(54) AUTOMATED RISK ASSESSMENTS USING A CONTEXTUAL DATA MODEL THAT CORRELATES PHYSICAL AND LOGICAL ASSETS

(75) Inventor: James J. Whitmore, Carlisle, PA (US)

(73) Assignee: International Business Machines Corporation, Armonk, NY (US)

( * ) Notice: Subject to any disclaimer, the term of this patent is extended or adjusted under 35 U.S.C. 154(b) by 1116 days.

(21) Appl. No.: 12/013,720

(22) Filed: Jan. 14, 2008

(65) Prior Publication Data

US 2009/0182593 A1   Jul. 16, 2009

(51) Int. Cl.
*G06Q 10/00* (2012.01)
(52) U.S. Cl. ...................... 705/7.11; 705/7.28
(58) Field of Classification Search .............. 705/7.11, 705/7.28
See application file for complete search history.

(56) References Cited

U.S. PATENT DOCUMENTS

| | | | |
|---|---|---|---|
| 7,096,188 B1 * | 8/2006 | Schlick et al. | 705/7.13 |
| 7,251,831 B2 | 7/2007 | Gilbert et al. | |
| 7,603,283 B1 * | 10/2009 | Spielmann et al. | 705/7.28 |
| 2005/0065807 A1 * | 3/2005 | DeAngelis et al. | 705/1 |
| 2007/0044151 A1 | 2/2007 | Whitmore | |
| 2007/0180490 A1 * | 8/2007 | Renzi et al. | 726/1 |
| 2008/0091490 A1 * | 4/2008 | Abrahams et al. | 705/7 |
| 2008/0126110 A1 * | 5/2008 | Haeberle et al. | 705/1 |
| 2008/0262895 A1 * | 10/2008 | Hofmeister et al. | 705/9 |

OTHER PUBLICATIONS

Emergency Disaster Planning for International Business Entities Denis A. Kleinfeld Journal of Asset Protection Jul./Aug. 1997.*
A new focus in business recovery Albert, Sam Midrange Systems, Oct. 11, 1996.*
Disaster recovery planning process Disaster Recovery Journal Geoffrey Wold Dec. 27, 2004.*
Preparing for the Worst AS/400 Systems Management; Arlington Heights; Dec. 1997; Mike Underwood.*
Evolution of Business Continuity Services Schladweiler, John Telecommunications, Aug. 1990.*
LAN Disaster Prevention and Recovery Patrick Corrigan 1994 Prentice Hall.*
Are You Prepared for Disaster Susana Schwartz Insurance & Technology Apr. 1997.*

* cited by examiner

*Primary Examiner* — William Rankins
(74) *Attorney, Agent, or Firm* — Patents on Demand, P.A.; Brian K. Buccheit; Scott M. Garrett

(57) ABSTRACT

An automated method, system, device, and/or computer program for performing risk assessment for an information system. A risk assessment tool can receive a scenario for which to perform a risk assessment. A contextual data model and a set of data instances for the information system can be accessed. The contextual data model can define relationships between physical and logical assets of the information system. The contextual data model and set of data instances can be analyzed in relation to the scenario. An action plan can be generated that addresses the scenario.

17 Claims, 4 Drawing Sheets

Security Concepts and Relationship Data Model 105

Evaluation Concepts and Relationship Data Model 150

AUTOMATED RISK ASSESSMENTS USING A CONTEXTUAL DATA MODEL THAT CORRELATES PHYSICAL AND LOGICAL ASSETS

BACKGROUND OF THE INVENTION

Figure 1:
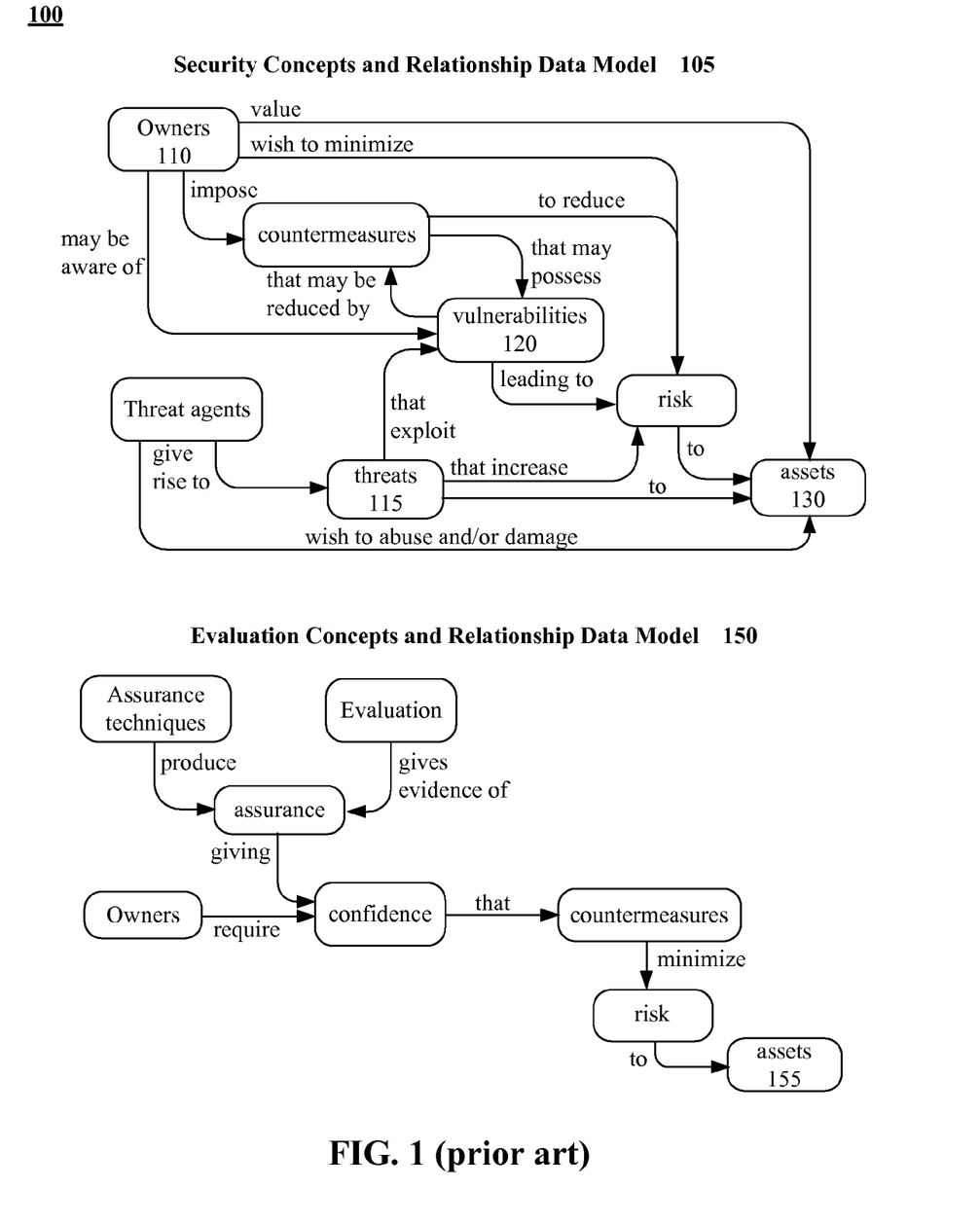
FIG. 1 (Prior Art) illustrates information system data models for assets and their relationships.

The present invention relates to the field of risk assessment and, more particularly, to an automated solution for performing information systems risk assessments using a contextual data model that correlates physical and logical assets. Risk assessment is a step in the risk management process. However, this step is prone to a variety of errors and approaches. In an attempt to provide a common understanding and approach to risk assessment, standards have been developed, such as IS 15408 Common Criteria. FIG. 1 illustrates the basic data models of IS 15408 regarding security concepts and relationships 105 and evaluation concepts and relationships 150.

These data models 105 and 150 illustrate the generic terms and simple relationships conveyed by IS 15408. Such simplistic models 105 and 150, while providing a basic foundation, have a diminished value because they are not readily applied to complex systems, such as information systems. In information systems, asset owners 110 can be also be a cause of threats 115 and vulnerabilities 120 through actions taken upon assets 130. These security interrelationships that are of concern in an information system are not accounted for in the security data model 105 of IS 15408.

Additionally, the broadness of terminology used in the data models 105 and 150 lack distinctions that are critical for information systems. For example, the term "assets" 130 and 155 is used in such a broad manner that there is no distinction between physical and logical assets. This lack of discrimination does not address differences in threats 115 and vulnerabilities 120 between physical and logical assets. Further, the relationships between physical and logical assets are not shown in these data models 105 and 150.

BRIEF SUMMARY OF THE INVENTION

One aspect of the present invention can include an automated method for performing risk assessment for an information system. Such a method can begin with the receipt by a risk assessment tool of a trigger event or condition in the form of data from the IT system, or a user initiated request in the form of a scenario, for which to perform a risk assessment. A contextual data model and a set of data instances for the information system can be accessed. The contextual data model can define relationships between physical and logical assets of the information system. The contextual data model and set of data instances can be analyzed in relation to the scenario and/or trigger event. An action plan can be generated that addresses the scenario and/or trigger event.

Another aspect of the present invention can include an automated system for performing risk assessment for an information system. Such a system can include a contextual data model of the information system, a set of data instances, and an information systems risk assessment tool. The contextual data model can be a composite of one or more data models of a risk assessment standard and a data model of the information system that contains relationships between physical and logical assets. The information systems risk assessment tool can be configured to generate an information systems action plan for a specified scenario. The tool can selectively be implemented in a static fashion, in accordance with a configurable sampling window, and/or in a dynamic fashion driven by real-time data.

Still another aspect of the present invention can include a contextual data model of an information system. The contextual information system data model can include one or more data models from a risk assessment standard, and a context data model of an information system. The context data model can define and relate the physical and logical assets of the information system.

DETAILED DESCRIPTION OF THE INVENTION

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 2:
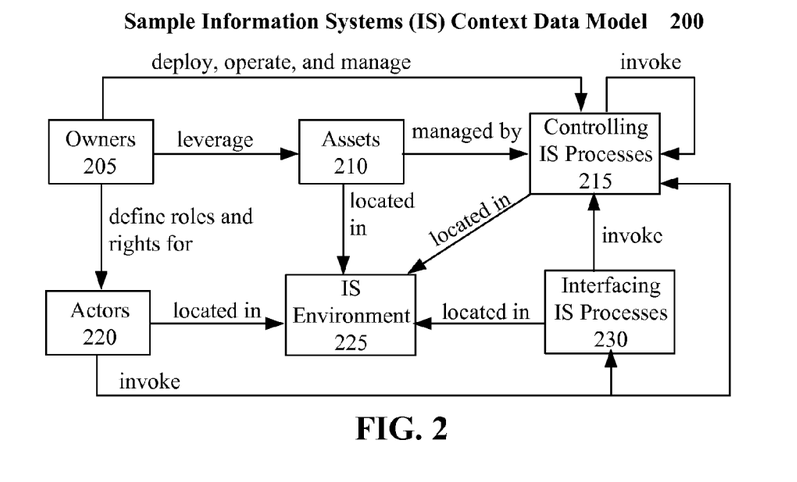
FIG. 2 is a sample information systems (IS) context data model of the high-level relationships between physical and logical assets of an information system in accordance with an embodiment of the inventive arrangements disclosed herein.

FIG. 2 is a sample information systems (IS) context data model 200 of the high-level relationships between physical and logical assets 210 of an information system in accordance with an embodiment of the inventive arrangements disclosed herein. It should be noted the sample IS context data model 200 is for illustrative purposes only and is not meant as an absolute representation.

As used herein, a physical asset is a tangible item of value to the information system. Examples of information system physical assets can include, but are not limited to, a building, a personal computer, a desk, a monitor, an employee, and the like. A logical asset is an intangible item of value to the information system. A logical asset can include items such as a software application, a database, a process, and the like. Thus, inherent relationships exist between the physical and logical assets of an information system. For example, a database can be stored in the memory space of a computer.

These relationships can be seen in the sample context data model 200. Owners 205 can represent the personnel responsible for the operation of an asset 210 located in the IS environment 225, and, are, therefore, physical assets of the information system.

Owners 205 can define roles and rights for actors 220. Actors 220 can represent personnel who can perform actions within the IS environment 225. It should be noted that an owner 205 can also be an actor 220. For example, a system administrator can be responsible for the operation of a server as well as perform actions upon the server.

Owners 205 can also deploy, operate, and/or manage controlling IS processes 215 that can be located within the IS environment 225. For example, a system administrator can deploy an automated back up script for a database server. Controlling IS processes 215 can invoke additional controlling processes 215 in their execution.

Actors 220 can also invoke controlling processes 215 as well as interfacing IS processes 230 contained within the IS environment 225. An interfacing process 230 can invoke a controlling process 215 as part of its execution. Thus, an interfacing process 230 can initiate a trigger event or condition that initiates an automated risk assessment operation.

It should be noted that this sample context data model 200 illustrates the affect of owners 205 and actors 220 upon the IS environment 225; relationships that are lacking from the data models 105 and 150 of the prior art shown in FIG. 1. Although owners 205 lack a direct relationship to the IS environment 225, they can influence all elements that are directly related to the IS environment 225.

Figure 3:
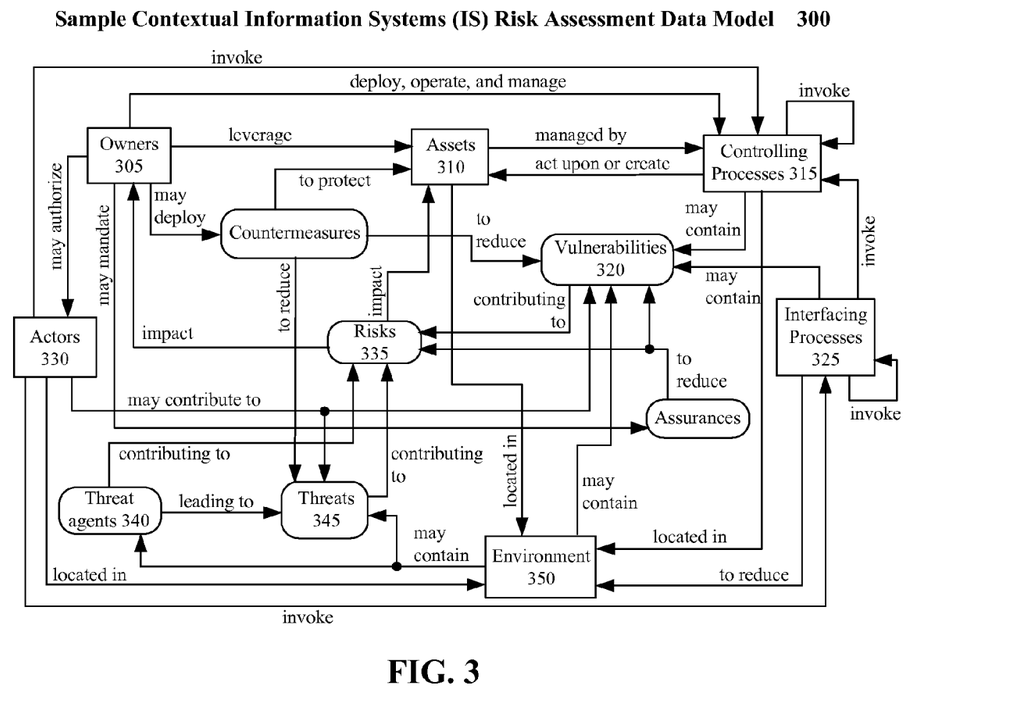
FIG. 3 is a sample contextual information systems (IS) risk assessment data model of an information system in accordance with an embodiment of the inventive arrangements disclosed herein.

FIG. 3 is a sample contextual information systems (IS) risk assessment data model 300 of an information system in accordance with an embodiment of the inventive arrangements disclosed herein. It should be noted the sample contextual information systems (IS) risk assessment data model 300 is for illustrative purposes only and is not meant as an absolute representation.

This sample contextual IS risk assessment data model 300 can incorporate the risk assessment data models 105 and 150 of a standard into the context data model 200 of an information system. Thus, the contextual IS risk assessment data model 300 can address concepts lacking from the separate data models 105, 150, and 200. For example, the IS context data model 200 related physical and logical assets of the information system, but did not include risk relationships.

The relationships illustrated in the contextual IS risk assessment data model 300 can present a more defined picture of the risks 335 and assets 310 within an information system. The relationships shown can allow for the assessment of risks 335 caused by another component of the information system, such as an owner 305 or an actor 330, where an "actor 330" can include an automated process (e.g., software routine) that triggers an event to automatically invoke a risk assessment operation. For example, a user can infect the information system with a computer virus by opening an unsafe email attachment, which can trigger an automated risk assessment operation.

Of note in this are the relationships between the elements of the standards data models 105 and 150 with the elements of the context data model 200. In this example, the contextual IS risk assessment data model 300 acknowledges that actors 330, controlling processes 315, interfacing processes 325, and the environment 350 can all contain vulnerabilities 350 that can contribute to risk 335. Further, the environment 350 can contain threat agents 340 and/or threats 345 that can contribute to risk 335.

It should also be noted that controlling processes 315 can act upon or create assets 310 within the contextual IS risk assessment data model 300. This relationship can represent actions internal to the operation of the information system, such as the instantiation of software applications, manipulation of data within databases, session management, and the like.

Figure 4:
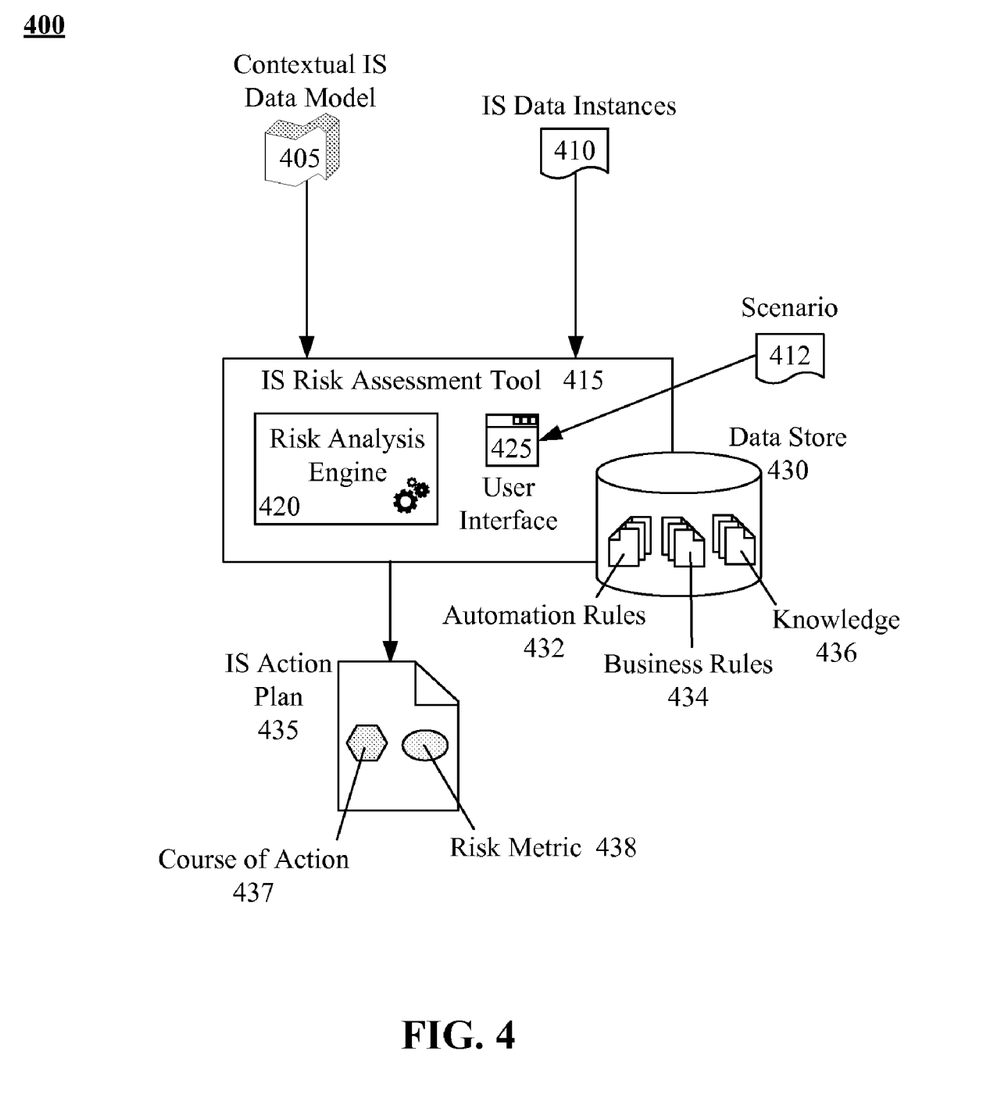
FIG. 4 is a schematic diagram of a system for performing risk assessment for an information system using a data model that correlates physical and logical assets in accordance with embodiments of the inventive arrangements disclosed herein.

FIG. 4 is a schematic diagram of a system 400 for performing risk assessment for an information system using a contextual IS data model 405 that correlates physical and logical assets in accordance with embodiments of the inventive arrangements disclosed herein. In system 400, an information systems (IS) risk assessment tool 415, herein referred to as the risk assessment tool, can generate an IS action plan 425 for an information system based upon a contextual data model 405 of that information system, a set of data instances 410, and a selected scenario 412.

The contextual IS data model 405 can represent a composite data model that correlates the physical and logical assets of an information system to standard risk assessment data model, such as the sample contextual IS data model 300 of FIG. 3. The IS data instances 410 can represent operating values, conditions, and/or states of the elements defined within the contextual data model 405.

The scenario 412 can represent a set of parameters or operating conditions of the information system that can be selected and/or defined by a user of the risk assessment tool 415 for the purposes of assessing the risk upon the information system. For example, a user can select a condition of "building fire" in order to assess the risks upon the information system and generate a prescriptive action plan 435. The scenarios 412 and conditions established therein can represent a set of trigger events, which automatically initiate selective risk assessment operations without explicit user interactions. For example, a condition of a building fire can trigger an automated risk assessment operation, which depending upon results can trigger one or more additional automated programmatic actions. For instance, when a risk of losing data stored within an in-building data store is greater (as determined by the IS risk assessment tool 415) than a previously determined threshold, then an emergency data backup action can be automatically initiated.

In another contemplated embodiment, the risk assessment tool 415 can function in a real-time or near real-time capacity, in which case the scenario 412 data may be unnecessary. Such an embodiment can require that the data instances 410 be received or updated frequently in order to allow the risk assessment tool 415 to perform an analysis when a predefined change occurs in the system.

For example, when the risk assessment tool 415 discovers that network connectivity for a server is lost, a risk assessment can be performed to determine if action needs to be taken to minimize risk to the system, such as mirroring the functions of the server at another location to not disrupt service.

The risk assessment tool 415 can be a software application that can generate an action plan 435 based upon the received data model 405, data instances 410, and scenario 412. The risk assessment tool 415 can include a risk analysis engine 420, a user interface 425, and a data store 430 containing automation rules 432, business rules 434, and knowledge 436.

The risk analysis engine 420 can be a software algorithm for generating an action plan 435 for the specified scenario. The risk analysis engine 420 can utilize the business rules 434 during analysis. The business rules 434 can represent predetermined organizational policies for addressing risk factors and/or the operation of the information system. For example, a business rule 434 can state that any risk to the primary database server is unacceptable.

The automation rules 432 can represent conditions under which the action plan 435 can be automatically implemented by the risk assessment tool 415. An example of an automation rule 432 can be to always automate the creation of new server instances. The automation rule 432 can contain the commands necessary to perform the action. Alternately, the automation rule 432 can contain an invocation command for a remotely located program that can perform the action.

Knowledge 436 can represent a diverse set of data that is situationally needed by risk analysis engine 420. Knowledge 436 can, for example, define a relevant state of physical and logical assets as well as their relationships. Knowledge 436, in include inferential and forecasted information that affects a physical or logical assets as well as their relationships. In one embodiment, knowledge 436 can include historical data maintained by tool 415 that is used to heuristically adjust output to improve accuracy. The risk analysis performed by the engine 420 can be an adaptive process, where the knowledge 426, rules, 432, 434 are able to be updated based on changes in business criteria, operational criteria, risk criteria, past experiences, and the like.

The risk assessment tool 415 can utilize a data driven methodology to produce the one action plan 435, given model 405, instances 410, and scenario 412. The automated risk analysis performed by the tool 415 can be implemented for static data, a sampling window of data, and/or for dynamic data. In a static situation, an assessment of risk is for a system at a point in time based upon a real or calculated state of physical and local assets along with their relationships. In a sampling window implementation, an assessment of risk of a system is based on a baseline (static) assessment of state plus trending data on the physical and logical assets and their relationships. Trending data can provide an inference of state possible change of a period of time beginning at the prior static (baseline) assessment and ending at the expiration of a configurable time period. In a dynamic implementation, a real time or near real time assessment can be performed. A dynamic implementation can be implemented as a variant of a sampling window implementation, where the sampling window ends at or near the current time.

For each of these implementation situations, a nature of the instance data 410 and the knowledge 436 needed by the risk analysis engine 420 can vary. For example, in a static situation, risk is related to a measured state of the physical and local assets and their relationships. Therefore, the risk analysis engine 420 needs to "know" (knowledge 436 must include) a state of the assets and perform rule 432, 434 matching between the state and the rules 432, 434 to arrive at an expression of the risks, embodied in the IS action plan 435.

In a sampling window situation, risk is related to the measured state of the physical and logical assets and their relationships, along with an expression of events and conditions, and their real or implied impact on the state of the physical or logical assets. Therefore, the risk analysis engine 420 needs to "know" (knowledge 436 must include) the state of the assets, as well as the inferential knowledge about the events and conditions. This feeds the rules 432, 434 matching process.

In the dynamic situation, risk is related to the measured state of physical and logical assets, the inferential risk of recent events and conditions, plus a probabilistic representation of a future state of the physical and logical assets and their relationships. This future state can be predicted using forecasting technologies driven by historical data (maintained in knowledge 436).

The user interface 425 can be the means by which a user of the risk assessment tool 415 can perform interactions, such as select a scenario 412. The user interface 425 can be configured to allow for the definition of business 434 and/or automation rules 432.

The action plan 435 generated by the risk assessment tool 415 can be an electronic document that describes the amount of risk associated with the given data 410 and scenario 412. The action plan 435 can include one or more course of actions 437 with corresponding risk metrics 438.

A course of action 437 can represent a recommendation of one or more actions to take in order to minimize potential risk. The risk metric 438 can represent a calculated level of risk associated with a course of action 437. For example, in a "building fire" scenario 412, a course of action 437 to do nothing can have 100% risk metric 438, whereas a course of action 437 to shut down all servers can have a 75% risk metric 438.

Risk metrics 438 can also be used in conjunction with a risk threshold (not shown) in the definition of automation rules 432. For example, an automation rule 432 can be set to automatically execute all course of actions 437 that have a risk metric 438 above 60%, where 60% is the risk threshold.

As used herein, presented data stores, including store 430 can be a physical or virtual storage space configured to store digital information. Data store 430 can be physically implemented within any type of hardware including, but not limited to, a magnetic disk, an optical disk, a semiconductor memory, a digitally encoded plastic memory, a holographic memory, or any other recording medium. Data store 430 can be a stand-alone storage unit as well as a storage unit formed from a plurality of physical devices. Additionally, information can be stored within data store 430 in a variety of manners. For example, information can be stored within a database structure or can be stored within one or more files of a file storage system, where each file may or may not be indexed for information searching purposes. Further, data store 430 can utilize one or more encryption mechanisms to protect stored information from unauthorized access.

Figure 5:
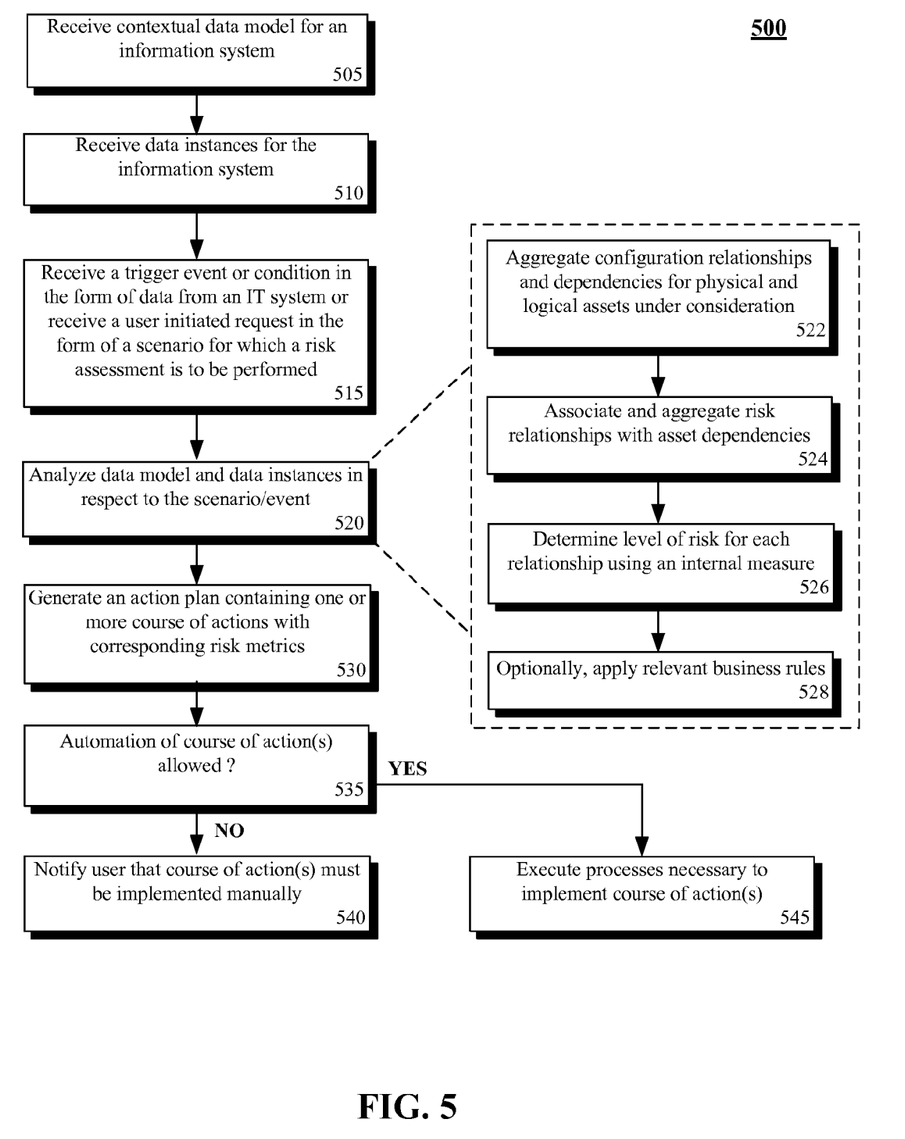
FIG. 5 is a flow chart of a method for performing risk assessment for an information system using a contextual data model that correlates physical and logical assets in accordance with an embodiment of the inventive arrangements disclosed herein.

FIG. 5 is a flow chart of a method 500 for performing risk assessment for an information system using a contextual data model that correlates physical and logical assets in accordance with an embodiment of the inventive arrangements disclosed herein. Method 500 can be performed within the context of system 300 and/or using the sample contextual IS risk assessment data model 300 of FIG. 3, or any other system configured to perform risk assessment for an information system using a contextual data model.

Method 500 can begin with step 505 where a contextual data model for an information system can be received. Data instances for the information system can be received in step 510. In step 515, the system can receive a trigger event or condition in the form of data from an IT system and/or can receive a user initiated request in the form of a scenario for which a risk assessment is to be performed.

The data model and data instances can be analyzed in respect to the user-selected scenario and/or appropriate system state information available when the trigger event occurred, as shown in step 520. The analysis performed in step 520 can consist of sub-steps 522-528. In step 522, the relationships and dependencies for the physical and logical assets of the information system that are affected can be aggregated.

The aggregated assets of step 522 can be associated and compiled with risk relationships in step 524. In step 526, a level of risk for each relationship can be determined. Optionally, business rules can be applied to the analysis in step 528.

Once the analysis of step 520 is complete, step 530 can execute where an action plan containing one or more course of actions with corresponding risk metrics can be generated. In step 535, it can be determined if the course of actions contained in the action plan can be automated.

When automation is allowed, the necessary processes can be executed to implement the course of action in step 545. When automation is not allowed, step 540 can execute where a user is notified that the action plan must be implemented manually.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for performing risk assessment for an information system comprising:
   receiving, via at least one computer device executing computer program instructions, an initiating event, wherein said initiating event comprises an automatic trigger event resulting from an occurrence of a predefined state of an information system;
   accessing, via at least one computer device executing computer program instructions, a contextual data model of the information system and a set of data instances representing at least one operating state of the information system, wherein the contextual data model defines relationships between physical and logical assets of the information system;
   analyzing, via at least one computer device executing computer program instructions, the contextual data model and set of data instances in relation to a previously established user-selected scenario;
   generating, via at least one computer device executing computer program instructions, an action plan for the information system and the previously established user-selected scenario;
   determining, via at least one computer device executing computer program instructions, an automation status of the action plan; and
   when the automation status is determined to be affirmative, automatically executing, via at least one computer device executing computer program instructions, at least one automation rule to implement the action plan, wherein the automation rule comprises at least one automated process, wherein the at least one automated process executes a series of commands within the information system.

2. The method of claim 1, wherein the automation status is controlled by a user-configurable value within the risk assessment tool.

3. The method of claim 1, further comprising: when the automation status is determined to be adverse, presenting the action plan for manual implementation.

4. The method of claim 1, wherein analyzing the contextual data model and set of data instances in relation to the user-selected scenario further comprises:
   determining, via at least one computer device executing computer program instructions, a set of assets within the information system that need to be considered for the user-selected scenario;
   compiling, via at least one computer device executing computer program instructions, relationships and dependencies for the set of assets under consideration;
   ascertaining, via at least one computer device executing computer program instructions, at least one risk relationship for the compiled relationships and dependencies; and
   calculating, via at least one computer device executing computer program instructions, a level of risk for the at least one risk relationship.

5. The method of claim 4, wherein ascertaining at least one risk relationship for the compiled relationships and dependencies comprises: utilizing a set of business rules representing a plurality of predetermined policies for addressing risk factors and operation of the information system.

6. The method of claim 4, further comprising calculating a level of risk for the at least one risk relationship in accordance with a standardized risk assessment methodology.

7. The method of claim 4, further comprising: comparing the calculated level of risk with a risk threshold value, wherein the risk threshold value represents a maximum level of risk allowed within the information system.

8. An automated system for performing risk assessment for an information system that correlates physical and logical assets comprising:
   a contextual data model of an information system that is digitally encoded in a non-transitory computer usable storage medium, said contextual data model defining a plurality of assets and relationships between said plurality of assets, wherein the contextual data model comprises at least one data model representing the information system, wherein the at least one data model of the information system discriminates and relates physical and logical assets of the information system;
   a set of data instances digitally encoded in a non-transitory computer usable storage medium, said set of data instances representing at least one operating state of the information system; and
   an information systems risk assessment tool, comprising computer program instructions stored on a non-transitory storage medium and that are executable by at least one processor, configured to utilize the contextual data model and the set of data instances to automatically determine an action plan, wherein the action plan is determined for a user-defined scenario, wherein said user-defined scenario defines a set of conditions for automatically initiating a programmatic operation that results in the information systems risk assessment tool generating the action plan, wherein said information systems risk assessment tool is selectively configurable to produce said action plan for a static risk assessment at a defined point in time, wherein said risk assessment tool is selectively configurable to produce said action plan for an static risk assessment for a defined time window, and wherein said risk assessment tool is selectively configurable to produce said action plan for a dynamic risk assessment performed against the information system in at least one of real-time and near real time.

9. The system of claim 8, wherein the risk assessment tool further comprises:
   a user interface, produced by computer program instructions stored on a non-transitory storage medium being executed by at least one processor, configured to accept at least one user-entered parameter, wherein the at least one user-entered parameter defines a condition for one of an asset and a relationship contained within the contextual data model;
   a set of business rules, digitally encoded and stored in a non-transitory medium, representing a plurality of pre-determined policies for addressing risk factors and operation of the information system; and
   a risk analysis engine, comprising computer program instructions stored on a non-transitory storage medium and that are executable by at least one processor, configured to utilize the at least one user-entered parameter, the set of business rules, the contextual data model, and the set of data instances to determine at least one course of action and a risk metric corresponding to the at least one course of action, wherein the at least one course of action and corresponding risk metric are contained within the action plan.

10. The system of claim 9, wherein the risk assessment tool further comprises: a set of automation rules defining at least one automated process, wherein the at least one automated process executes a series of commands within the information system to implement the at least one course of action of the action plan.

11. The system of claim 10, wherein an execution of an automation rule is performed automatically based upon a business rule.

12. The system of claim 8, wherein at least one data instance of the set of data instances is received in real-time from at least one component of the information system.

13. A computer program product comprising a non-transitory computer useable storage medium having computer usable program embodied therewith, wherein the computer usable program code when executed on a computer causes the computer to:
   receive an initiating event, wherein said initiating event comprises an automatic trigger event resulting from an occurrence of a predefined state of an information system;
   access a contextual data model of the information system and a set of data instances representing at least one operating state of the information system, wherein the contextual data model defines relationships between physical and logical assets of the information system;
   analyze the contextual data model and set of data instances in relation to a previously established user-selected scenario;
   generate an action plan for the information system and the previously established user-selected scenario;
   determine an automation status of the action plan; and
   when the automation status is determined to be affirmative, automatically execute at least one automation rule to implement the action plan, wherein the automation rule comprises at least one automated process, wherein the at least one automated process executes a series of commands within the information system.

14. The computer program product of claim 13, wherein the automation status is controlled by a user-configurable value within the risk assessment tool.

15. The computer program product of claim 13, wherein the computer usable program code when executed on a computer further causes the computer to: when the automation status is determined to be adverse, present the action plan for manual implementation.

16. The computer program product of claim 13, when the computer usable program code causes the computer to analyze the contextual data model and set of data instances in relation to the user-selected scenario, the computer usable program code further causes the computer to:
   determine a set of assets within the information system that need to be considered for the user-selected scenario;
   compile relationships and dependencies for the set of assets under consideration;
   ascertain at least one risk relationship for the compiled relationships and dependencies; and
   calculate a level of risk for the at least one risk relationship.

17. The computer program product of claim 13, when the computer usable program code causes the computer to: compare the calculated level of risk with a risk threshold value, wherein the risk threshold value represents a maximum level of risk allowed within the information system.

* * * * *